No. 705,919. Patented July 29, 1902.
E. R. GILL.
ELECTRIC BATTERY.
(Application filed Nov. 15, 1901.)
(No Model.)

Witnesses
Ed__ard Rowland
Samuel C. E. Carpenter

Edwin R. Gill Inventor
By his Attorney H. S. Mackaye

UNITED STATES PATENT OFFICE.

EDWIN R. GILL, OF NEW YORK, N. Y.

ELECTRIC BATTERY.

SPECIFICATION forming part of Letters Patent No. 705,919, dated July 29, 1902.

Application filed November 15, 1901. Serial No. 82,478. (No model.)

*To all whom it may concern:*

Be it known that I, EDWIN R. GILL, a citizen of the United States, residing in the city, county, and State of New York, have invented a certain new and useful Improvement in Electric Batteries, of which the following is a specification.

My present invention has relation to an improved form of battery-cell so constructed as to reduce the time and labor involved in making and breaking electrical connections to a minimum.

My invention further includes an improved form of socket whereby cells made in accordance with my invention are quickly and easily put into or out of circuit, and more particularly wherein one or more cells may be put into or out of circuit with others without interfering with the operation of the battery save to the extent to which the voltage of the same is necessarily affected.

My invention is illustrated in two preferred forms in the accompanying drawings, wherein—

Figure 1:
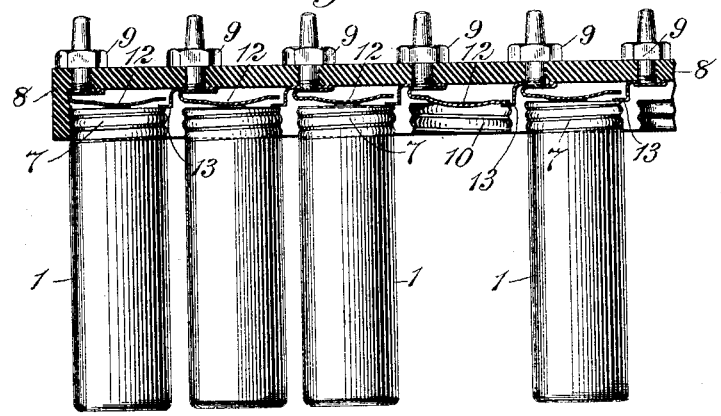
Figure 2:
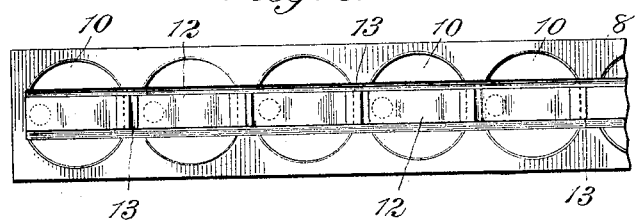
Figure 3:
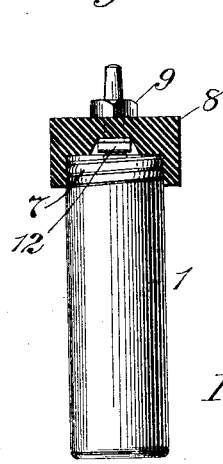
Figure 5:
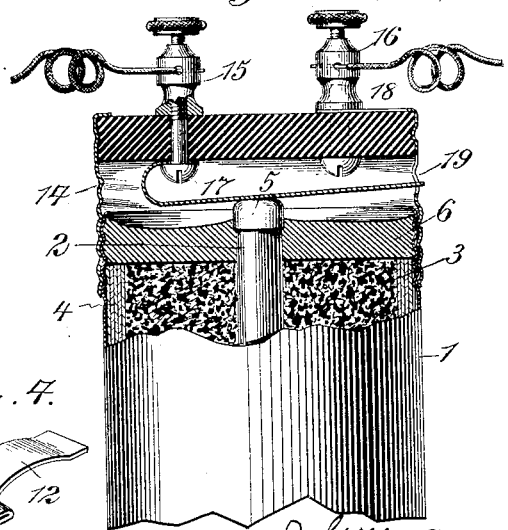
Figure 4:
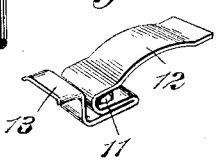

Figure 1 is a side elevation of a battery with one cell removed, showing the automatic preservation of a continuous circuit. Fig. 2 is a bottom view of the battery-head shown in Fig. 1, showing the preferred arrangement of sockets and springs. Fig. 3 shows a single cell in elevation, together with its insulating-head in cross-section. Fig. 4 is a perspective view of the contact-spring shown in Fig. 1; and Fig. 5 is an enlarged view of a modified form of cell and head-socket, partly in vertical section.

Heretofore electric batteries have been built up of cells connected by conductors secured in place by binding-posts, the positive and negative electrodes being appropriately joined according as series or multiple or series-multiple arrangement was desired. In any given battery the proper connections for obtaining the necessary or desirable electric effects (as to voltage and amperage) can only be established by a competent electrician. In batteries as heretofore commonly constructed the removal or insertion of a cell required a like skilled knowledge, since the connections were necessarily interrupted and had to be reëstablished according to rules not understood by non-technical users. My invention in its preferred form obviates this difficulty, since the removal or insertion of a cell into a circuit is automatically accompanied by appropriate changes in connections without disturbing conductors or binding-posts. The use of binding-posts and conductors furthermore implies a certain degree of variability in resistance at connections, and changes of circuit involving the unscrewing and rescrewing of binding-posts inevitably produce uncertainties in ohmic resistance which are very annoying in certain classes of delicate quantitative electric apparatus wherein batteries are employed. My invention obviates this difficulty, since it permits of the removal or insertion of cells in a battery without disturbing the binding-posts.

My invention possesses the further advantage of greatly lessening the labor and time involved in the manipulation of battery-cells, making it possible for any one to quickly and easily renew cells without possibility of making mistakes.

While the general principle of my invention is applicable to any known type of electric-battery cell, I have herein shown and described it as applied to dry batteries, wherein it finds its broadest application.

My improved cell preferably involves an exterior containing-electrode 1, of zinc or other appropriate metal, an interior electrode 2, preferably centrally placed, and an electrolyte 3, of any appropriate constitution, separating the electrodes. In dry cells moist blotting-paper or its equivalent will be used, as at 4. In this class of cells I prefer to provide a carbon rod at 2 and to place thereon a metallic contact-cap 5. The top of the dry cell is sealed, as at 6, with paraffin or wax or other appropriate material. In my improved cell the outer electrode is provided with a screw-thread 7, preferably pressed, rolled, molded, or cut into the material of the electrode itself. The use of this novel feature is made clear in the drawings.

In Fig. 1 is shown a battery consisting of dry cells in series, the insulating-head 8 being used to hold the cells together, the same being preferably provided with binding-posts 9, whereby the current may be tapped off at any two points desired. Near to each binding-post 9 the under side of the head 8 is provided with a screw-threaded cavity or socket 10. Into each of these sockets a battery-cell is secured by means of its threads 7. To the under side of each binding-post is secured a two-leaf spring. (Shown in detail in Fig. 4.) This particular form of spring is not essential to my broad invention. The spring has a screw-threaded hole 11, intended to receive the lower end of the binding-post screw 9. There are two resilient leaves 12 and 13. The leaf 12 serves to make contact with the interior electrode or its cap 5 when the cell is in place. The leaf 13 projects toward the next contiguous socket and forms a ledge or lip upon which the tip of the most adjacent electrode-leaf is adapted to rest when the corresponding cell is removed. This overlapping is plainly shown at 13 in Figs. 1 and 2.

It will be seen that by employing the construction thus far described the removal of a cell in any battery causes establishing of a circuit across the break thus made. When, on the other hand, a cell is screwed into any given socket, it pushes up the leaf 12, separating it from the lip or leaf 13, and at the same time the upper edge of the exterior electrode comes against the under side of said leaf 13, making electric contact therewith.

By inspection of Fig. 1 the circuits in the battery may be followed from the left-hand post 9 through its appropriate spring-leaf 12 to the interior electrode of the left-hand cell, through said cell to the exterior electrode, thence to the lip or leaf 13 on the next adjacent spring, repeating this path through successive sockets and cells until an empty socket is reached. Here, as shown, the current passes directly from the leaf 12 of the empty socket to the leaf 13 of the next socket, since these two leaves are left in contact on withdrawal of the cell from the empty socket.

My invention is susceptible of many modifications, and to illustrate this I have shown one modified form thereof in Fig. 5, wherein is shown a single cell and its socket, which may or may not be in circuit with other cells. Here the socket, besides the insulating-head 8, has a depending threaded metal sleeve 14, into which the threaded cell is screwed, as shown. Two binding-posts 15 and 16 are provided, to one of which is secured the spring 17, in this instance comprising only one leaf. An extension 18 of the metal ring 14 passes under the post 16, thus establishing electrical connection therewith. It will thus be seen that on inserting the cell into its socket, as shown in Fig. 5, the cap 5 makes contact with the spring 17, and the binding-posts 15 and 16 are thus converted into exterior electrodes. On withdrawing the cell from its socket the spring 17 must be allowed to fall back against some part in metallic connection with the binding-post 16, so as to automatically bridge the electric break otherwise caused by this withdrawal. For this purpose I prefer to provide an opening 19 in the side of the ring 14 and to make the spring 17 project through the same. This being done, withdrawal of the cell permits the tip of the spring 17 to come down upon the lower edge of the opening 19, thus establishing connection directly between the post 15 and the ring 14 and through the latter to the post 16.

As many changes may be made in the above-described constructions without departing from the scope of my invention, I am not to be understood as limiting myself to the details as herein shown and described.

What I claim is—

1. As an article of manufacture, a battery-cell having an exterior screw-threaded electrode.

2. As an article of manufacture a battery-cell having a screw-threaded top in electrical connection with one electrode of said cell.

3. A screw-threaded socket, and a contact-spring therein; in combination with a battery-cell having threads adapted to screw into said socket.

4. A socket and two terminal pieces attached thereto, in combination with a battery-cell fitting said socket and having electrodes adapted to make contact with said socket-terminals respectively and means for securing said cell in said socket.

5. A socket and two terminal pieces attached thereto so constructed as to make contact when said socket is empty; in combination with a battery-cell fitting said socket and having electrodes adapted to make contact with said socket-terminals respectively and means for securing said cell in said socket.

6. A screw-threaded socket, a terminal spring therein and a second terminal upon which said spring normally bears; in combination with a screw-threaded battery-cell fitting said socket and having an electrode adapted to lift said spring-terminal off of said second terminal when said cell is screwed home in said socket.

7. A screw-threaded socket, a terminal at the side thereof and a terminal in the middle thereof; in combination with a battery-cell having an exterior electrode screw-threaded to fit said socket and an interior electrode so placed that when the cell is screwed home in said socket said interior electrode touches the terminal in the middle of the socket and the exterior electrode bears upon the terminal at the side of the socket.

8. As an article of manufacture, an insulating battery-head provided with sockets for receiving cells, and a spring at each socket, said springs overlapping from one socket to the other and normally making contact each with its neighbor.

9. An insulating-head, screw-sockets thereon, a binding-post beside each socket and a two-leaved spring attached to said post, one leaf of which extends across one contiguous socket and the other leaf of which extends to the edge of the other contiguous socket; in combination with a battery-cell having an external screw-threaded electrode fitting said socket and adapted to touch one leaf of one adjacent contact-spring and an interior electrode adapted to touch one leaf of the other adjacent contact-spring.

E. R. GILL.

Witnesses:
HAROLD S. MACKAY,
F. W. LONGFELLOW.